United States Patent

Wallmeier

(10) Patent No.: US 8,817,840 B2
(45) Date of Patent: Aug. 26, 2014

(54) POWER SUPPLY ARRANGEMENT

(75) Inventor: Peter Wallmeier, Lippstadt (DE)

(73) Assignee: AEG Power Solutions B.V., Zwanenburg (NL)

( * ) Notice: Subject to any disclaimer, the term of this patent is extended or adjusted under 35 U.S.C. 154(b) by 910 days.

(21) Appl. No.: 12/757,143

(22) Filed: Apr. 9, 2010

(65) Prior Publication Data

US 2011/0216802 A1 Sep. 8, 2011

(30) Foreign Application Priority Data

Mar. 5, 2010 (EP) .................................... 10155566

(51) Int. Cl.
*H05B 7/148* (2006.01)
*H05B 7/144* (2006.01)
*H02M 5/257* (2006.01)

(52) U.S. Cl.
CPC ............. *H02M 5/2573* (2013.01); *H05B 7/144* (2013.01)
USPC ............................. 373/104; 373/102; 373/108

(58) Field of Classification Search
USPC ............. 373/102, 104, 105, 108, 47, 49, 147, 373/148; 323/207–211; 363/17, 71, 95, 98, 363/131, 132, 135, 136; 219/675, 69.1, 219/121.54, 660, 661, 715

See application file for complete search history.

(56) References Cited

U.S. PATENT DOCUMENTS

| 4,818,836 | A * | 4/1989 | Bebber et al. ............. 219/121.54 |
| 6,421,366 | B1 * | 7/2002 | Breker et al. .................. 373/102 |
| 7,881,078 | B2 * | 2/2011 | Pereira et al. .................... 363/37 |
| 2007/0247079 | A1 * | 10/2007 | Sager et al. ............... 315/200 R |

* cited by examiner

*Primary Examiner* — Henry Yuen
*Assistant Examiner* — Hung D Nguyen
(74) *Attorney, Agent, or Firm* — Cohen & Hildebrand, PLLC

(57) ABSTRACT

A power supply arrangement for supplying a square-wave current (I2) to a load connected to an output of the power supply arrangement, in particular a power supply arrangement in an arc furnace for generating an arc, including a transformer (TU) with at least two primary-site taps (1U1, 1U2) which form an input of the power supply arrangement, and with several secondary-side taps (2U1, 2U2, 2U3, 2UN), a bridge circuit (BU) with several first half bridges (11, 12, 13) which include converter valves (V11, V12, V13, V14, V15, V16) and which each have a first terminal (A11, A12, A13) of the bridge circuit, with a bridge section with a choke (L1), and with a second half bridge (20) which has converter valves (V17, V18) and a second terminal (A20) of the bridge circuit (BU), wherein each first terminal (A11, A12, A13) is connected to one of the secondary-side taps (2U1, 2U2, 2U3) of the transformer (TU), wherein the second terminal (A20) is connected to the output.

14 Claims, 3 Drawing Sheets

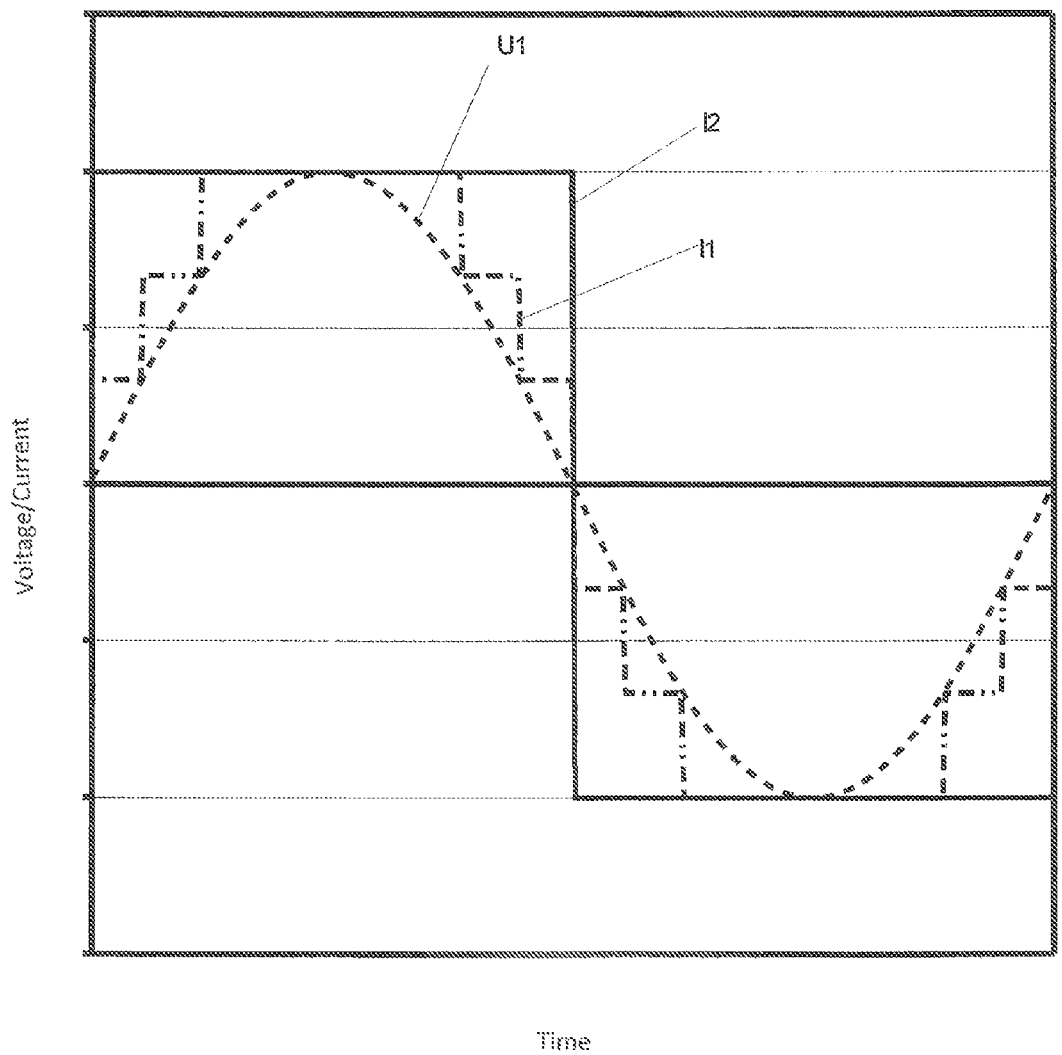

POWER SUPPLY ARRANGEMENT

Figure 1:
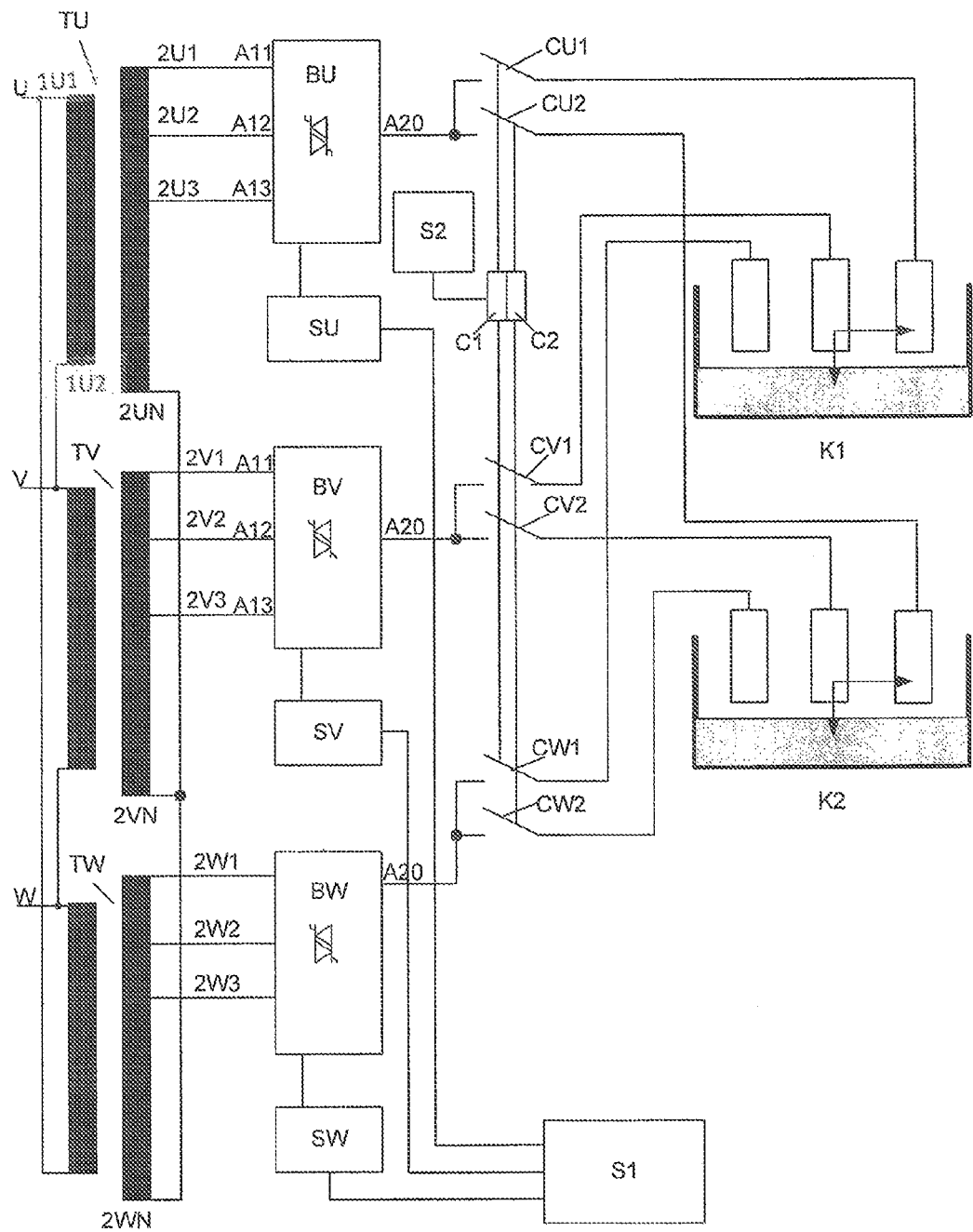

BACKGROUND OF THE INVENTION (1) Field of the Invention

The present invention relates to a power supply arrangement for supplying a square-wave current to a load connected to an output of the power supply arrangement, in particular a power supply arrangement in an arc furnace for producing an arc.

(2) Description of Related Art

Various power supply arrangements for supplying electric energy to an arc furnace are known in the art. Arc furnaces are used for melting steel scrap to be used for new steel products. Arc furnaces employ electric energy to melt steel scrap. The energy is converted into thermal energy which causes the steel scrap to melt. Heat produced by the arc burning between the electrode and the steel scrap is transferred to the steel scrap primarily through radiation. In an AC arc furnace, several arcs burn between the steel scrap (or the melt) and the electrode tips of the three electrodes.

A transformer of a power supply arrangement of an arc furnace adapts the energy provided by a power mains to the current and voltage required for the operation of the furnace. In arc furnaces, there is always the risk of undesirable feedback into the power mains due to non-uniform burning of the arc.

BRIEF SUMMARY OF THE INVENTION

This problem is solved by a power supply arrangement according to the invention with a transformer and a bridge circuit. The transformer has at least two primary-side taps which form an input of the power supply arrangement. In addition, the transformer has several secondary-side taps. The bridge circuit includes several first half bridges, a second half bridge and a bridge section. Each of the first half bridges Includes converter valves and a corresponding first terminal of the bridge circuit. The second half bridge has converter valves and a second terminal of the bridge circuit. A choke is arranged in the bridge circuit.

Each first terminal of the bridge circuit is connected to one of the secondary-side taps of the transformer. Conversely, the second terminal of the bridge circuit is connected to the output of the circuit arrangement. The bridge circuit can then be connected in series with the output of the power supply arrangement. As viewed from the output, the power supply arrangement forms a current source which supplies a current through the second terminal of the bridge circuit. The current is preferably a square-wave and has the same frequency as the voltage at the input of the power supply arrangement. Because the second terminal of the bridge circuit is directly connected to the output of the power supply arrangement, this square-wave current also flows through the output of the power supply arrangement. Other shapes of current curve are also feasible. A power supply arrangement may have additional circuit elements or components which may be arranged between the second terminal of the bridge circuit and the output of the power supply arrangement and which may be configured to change the current.

The power supply arrangement with a load connected to the output can be operated with a method according to the invention by having a control means control the converter valves of the first half bridges during a mains half period sequentially for through-switching in such a way that the current through the output of the power supply arrangement is converted into a stepped current which approximates the current curve of the mains voltage. The number of possible steps of the input-side current of the power supply arrangement depends here on the number of the secondary-side taps of the transformer and on the first terminals of the bridge circuit connected to the taps.

The voltage ratio of the transformer can be defined by sequentially connecting the converter valves of the first half bridges and selecting the corresponding secondary-side taps of the transformers. By selecting the voltage ratio of the transformer, the current through the second tap which is constant during a mains half period and applied by the choke in the bridge section can be transformed into a desired current through the input of the power supply arrangement. The current through the input can then be matched to the voltage curve of the voltage present at the input of the power supply arrangement. This approach can produce a high power factor through reduction of the harmonic content in the input current.

A high power factor can already be achieved by sequentially switching the converter valves of the first half bridges on during the first half of a mains half period, i.e. while the magnitude of the secondary-side voltage increases. Suitable converter valves are thyristors. It is also possible to sequentially switch the converter valves off during the second halves of the power mains periods, i.e., when the magnitude of the secondary-side voltage decreases. Suitable converter valves are IGBTs and GTOs. Also suitable are modifications thereof, such as IGCTs, etc.

The first half bridges of a power supply arrangement according to the invention may have two converter valves. In each first half bridge, an anode of a first converter valve of the two converter valves and a cathode of a second converter valve of the two converter valves may be connected to the first terminal of the bridge section arranged in this bridge circuit. The cathodes of the first converter valves of the first half bridges may be connected to a first node of the bridge circuit while the anodes of the second converter valves of the first half bridges may be connected to a second node of the bridge circuit.

The bridge section is advantageously located between the first node and the second node.

The second half bridge of a power supply arrangement according to the invention may include two converter valves. The anodes of each first converter valve of the two converter valves and the cathodes of each second converter valve of the two converter valves may be connected to the second terminal of the bridge circuit. The cathode of the first converter valve of the second half bridge may be connected to the first node of the bridge circuit, while the anode of the second converter valves of the second half bridge may be connected to the second node of the bridge circuit.

A power supply arrangement according to the invention might include at least one control means for controlling the converter valves.

The first converter valve and the second converter valve of the second half bridge are preferably controlled for through-switching in push-pull operation synchronously with an AC voltage applied to the input of the power supply arrangement. The first converter valves of the first half bridges are preferably sequentially controlled for through-switching during a first half period of the AC voltage present at the input, while the second converter valves of the first half bridges are preferably sequentially controlled for through-switching during a second half period of the AC voltage present at the input.

Means for generating pulses for through-switching of the converter valves may be arranged downstream of the control means. Pulse transmission means connected to a control electrode of the converter valves may be arranged downstream of the pulse generating means.

The converter valves are preferably implemented as thyristors. However, other controllable switching elements, in particular other types of power semiconductors, may be employed.

Advantageously, an arc furnace may include three power supply arrangements according to the invention. The primary sides of the transformers of the power supply arrangements are advantageously connected in a Delta configuration, with an electrode of the arc furnace being connected to the output of each power supply arrangement. A system with two arc furnaces may have a total of three power arrangements according to the invention, wherein the two arc furnaces are alternatingly supplied with electric current from the power supply arrangements.

Additional features and advantages of an exemplary embodiment according to the present invention will now be described with reference to the appended drawings, which show in:

BRIEF DESCRIPTION OF THE SEVERAL VIEWS OF THE DRAWING(S)

Figure 2:
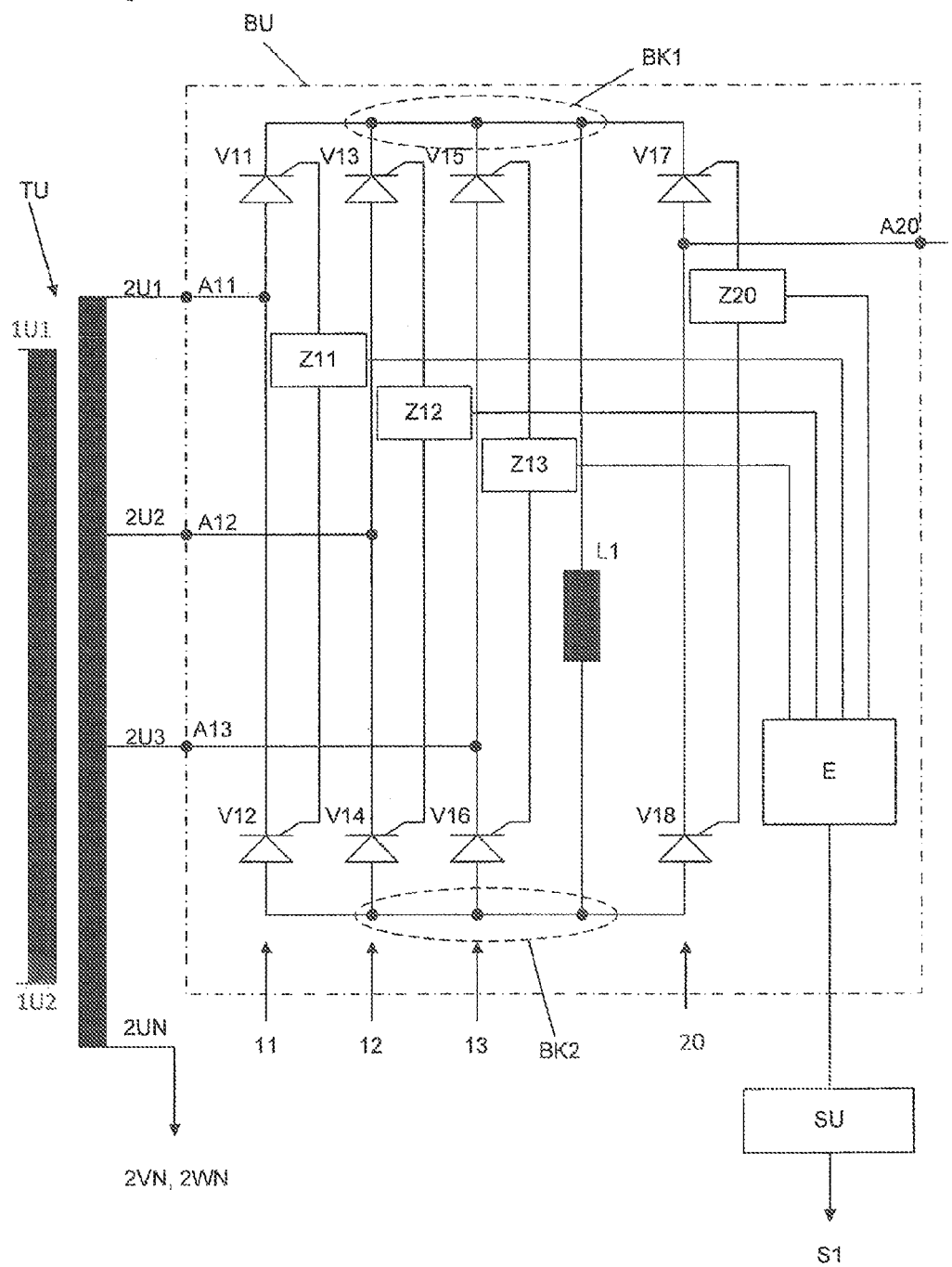

FIG. 1 a schematic circuit diagram of an arrangement with two arc furnaces and a total of three power supply arrangements, FIG. 2 a section of the arrangement of FIG. 1 with a more detailed diagram of a bridge circuit of one of the power supply arrangements, and FIG. 3 schematically, a curve of the current through the input, the current through the output, and also the voltage at the input of one of the power supply arrangements.

DETAILED DESCRIPTION OF THE INVENTION

FIG. 1 shows three transformers TU, TV, TW which are connected on their primary site in a Delta configuration to the three phase conductors U, V, W of a three phase power mains. The secondary sides of the transformers TU, TV, TW are connected in star configuration. The secondary-side taps 2UN, 2VN, 2WN of the transformers TU, TV, TW are therefore connected to one another.

In addition to the secondary-side taps 2UN, 2VN, 2WN, the transformers TU, TV, TW have three additional taps 2U1, 2U2, 2U3, 2V1, 2V2, 2V3, 2W1, 2W2, 2W3. These secondary-side taps 2U1, 2U2, 2U3, 2V1, 2V2, 2V3, 2W1, 2W2, 2W3 are connected to bridge circuits BU, BV, BW, and more particularly, the secondary-side taps of the transformer TU to the bridge circuit BU, the secondary-side taps of the transformer TV to the bridge circuit BV, and the secondary-side taps of the transformer TW to the bridge circuit BW. The bridge circuits BU, BV, BW include a number of thyristors and are constructed identically.

The bridge circuits have outputs A20 which are connected to the electrodes of the arc furnaces K1, K2 via two intermediate contactors C1, C2 having switch contacts CU1, CU2, CV1, CV2, CW1, CW2. The contactors C1, C2 are controlled by a controller S2 which ensures that the arc furnaces cannot be operated simultaneously.

Controllers SU, SV, SW associated with the bridge circuits BU, BV, BW as well as a superordinate controller S1 are provided for controlling the converter valves of the bridge circuits BU, BV, BW.

An exemplary embodiment of the bridge circuit BU will now be described in more detail with reference to FIG. 2:

The bridge circuit BU has three first half bridges 11, 12, 13 which are preferably constructed identically. Each first half bridge 11, 12, 13 as a converter valve embodied as a first thyristor V11, V13, V15 and a second thyristor V12, V14, V16, which can each be switched on and off. The cathodes of the first thyristors V11, V13, V15 are connected to one another at a first node BK1, and the anodes of the second thyristors V12, V14, V16 are connected to one another at a second node BK2. In addition, the anode of the first thyristor and the cathode of the second thyristor in each bridge section 11, 12, 13 are connected to a corresponding first terminal A11, A12, A13 of the bridge circuit.

The first terminals A11, A12, A13 of the bridge circuit BU are each connected to a corresponding secondary-side tap 2U1, 2U2, 2U3 of the transformer TU. The corresponding first terminals A11, A12, A13 of the bridge circuits BV, BW are connected to the corresponding secondary-side taps 2V1, 2V2, 2V3, 2W1, 2W2, 2W3 of the transformers TV, TW.

The bridge section connects the first node BK1 and the second node BK2, and includes a choke L1. Due to its inductance, the choke drives a current through the bridge section during operation of the power supply arrangement.

The second half bridge 14 has a first thyristor V17 and a second thyristor V18 as converter valves. These thyristors need only be turn-on thyristors. The cathode of the first thyristor V17 is connected to the first node BK1 which is in turn connected to the output A of the power supply arrangement. Likewise, the cathode of the second thyristor V18 is connected to the second terminal A20, with the anode of the second thyristor connected to the second node BK2.

The bridge circuit BU can receive electric energy from the phase U of the power mains by way of the transformer TU. The power mains has a nominal voltage. However, the current through the input of the power supply arrangement is determined by the current flowing through the secondary coil of the transformer. The current flowing through the secondary coil of the transformer TU corresponds to the load current through the output of the power supply arrangement. This current can only flow when either one of the two thyristors V11, V13, V15 of the first half bridges 11, 12, 13 and the second thyristor V18 are conducting, or when one of the second thyristors V12, V14, V16 of the second half bridges 11, 12, 13 and the first thyristor V17 are conducting.

The input voltage of the power supply arrangement is transformed by the transformer TU to the secondary side, producing a voltage between one of the secondary-side taps 2U1, 2U2, 2U3 of the transformer TU and the secondary-side tap 2UN. This secondary-side voltage is also present across one of the first terminals A11, A12, A13, one of the thyristors V11, V12, V13, V14, V15, V16, the bridge section with the choke L1 and one of the thyristors V17, V18 of the second half bridge 20, the terminal A20 and the terminal A, respectively, of the power supply arrangement, and drives the secondary-side current, i.e., the load current. The load current is determined by the choke L1, through which a continuous current flows during operation. The choke L1 can therefore be viewed as representing an ideal current source.

The thyristors V17, V18 of the second half bridge are operated in push-pull operation synchronously with the power mains. As a result, the current from the ideal current source through the second half bridge and through the output A takes on a square-wave shape.

The first bridge section carrying the secondary current can be defined by controlling the thyristors V11, V12, V13, V14, V15, V16. The secondary-side tap 2U1, 2U2, 2U3 carrying the secondary current is then also defined. Selection of the tap 2U1, 2U2, 2U3 also defines the voltage ratio transforming the secondary current to the primary side. Accordingly, the primary current of the transformer can be adjusted through selection of the current-conducting first bridge section.

By having the option to adjust the primary current, a current can be set on the primary side which produces the highest possible power factor for a predetermined primary voltage. This is achieved for a sinusoidal primary voltage U1 by approximating the primary current I1 as a sinusoidal curve through selection of the current-carrying first bridge section, thereby reducing the harmonic content. This is illustrated in FIG. 3 which also shows the secondary current I2.

If instead of transistors that can be turned on and off, only turn-on thyristors are used in the first bridge sections, then a stepped current curve for the primary current may only be attained in the corresponding first halves of a mains half period. During the second half, the current would then be equal to the current at the voltage peak.

The invention claimed is:

1. A power supply arrangement for supplying a square-wave current (12) to a load connected to an output of the power supply arrangement, comprising:
   a transformer (TU) including at least two primary-side taps (1U1, 1U2) which form an input of the power supply arrangement, and a secondary winding of the transformer (TU) having a plurality of secondary-side taps (2U1, 2U2, 2U3, 2UN);
   a bridge circuit (BU) comprising:
      a plurality of first half bridges (11, 12, 13) which include convener valves (V11, V12, V13, V14, V15, V16) and which each have a first terminal (A11, A12, A13) of the bridge circuit,
      a bridge section with a choke (L1), and
      a second half bridge (20) which has converter valves (V17, V18) and a second terminal (A20) of the bridge circuit (BU),
      wherein each first terminal (A11, A12, A13) is connected to one of the secondary-side taps (2U1 2U2, 2U3) of the transformer (TU),
      wherein the second terminal (A20) is connected to the output;
      wherein the plural secondary side-taps (2U1, 2U2, 2U3, 2UN) include a first end tap (2U1), an opposite second end tap (2UN) and at least one intermediate tap (2U2, 2U3) disposed therebetween; the first end tap (2U1) and each of the at least one intermediate tap (2U2, 2U3), respectively, are connected with the first terminal (A11, A12, A13) of the plural first half bridges (11, 12, 13);
      wherein each of the first half bridges (11, 12, 13) has a first converter valve (V11, V13, V15) and a second converter valve (V12, V14, V16); and wherein the second half bridge (20) comprises a first converter valve (V17) and a second convener valve (V18); cathodes of the first converter valve (V11, V13, V15) of each of the first half bridges (11, 12, 13) are connected to a cathode of the first converter valve (V17) of the second half bridge (20) at a first node (BK1) of the bridge circuit; anodes of the second converter valve (V12, V14, V16) of each of the first half bridges (11, 12, 13) are connected to an anode of the second convener valve (V18) of the second half bridge (20) at a second node (BK2) of the bridge circuit;
      wherein in each first half bride an anode of a first converter valve (V11, V13, V15) of the two converter valves and a cathode of a second converter valve (V12, V14, V16) of the two converter valves is connected to the first terminal (A11, A12, A13) of the bridge circuit (BU) arranged in the bridge section.

2. The power supply arrangement according to claim 1, wherein the bridge section is located between the first node (BK1) and the second node (BK2).

3. The power supply arrangement according to claim 2, wherein the choke (L1) directly connects the first node (BK1) and the second node (BK2).

4. The power supply arrangement according to claim 1, wherein the anode of the first converter valve (V17) of the two convener valves (V17, V18) and the cathode of a second convener valve (V18) of the two converter valves (V17, V18) are connected to the second terminal (A20) of the bridge circuit (BU).

5. The power supply arrangement according to claim 4, wherein the cathode of the first converter valve (V17) of the second half bridge (20) is connected to the first node (BK1) of the bridge circuit (BU) and the anode of the second converter valve (V18) of the second half bridge (20) is connected to the second node (BK2) of the bridge circuit (BU).

6. The power supply arrangement according to claim 1, wherein the power supply arrangement comprises at least one control means (S1) for controlling the converter valves (V11, V12, V13, V14, V15, V16).

7. The power supply arrangement according to claim 6, wherein the first converter valve (V17) and the second converter valve (V18) of the second half bridge (20) are controllable for through-switching in a push-pull operation and synchronous to an AC voltage applied to an input (U, V) of the power supply arrangement.

8. The power supply arrangement according, to claim 6, wherein the first converter valves (V11, V13, V15) of the first half bridges (11, 12, 13) are sequentially controllable for through-switching during a first half period of the AC voltage applied to the input, and the second converter valves (V12, V14, V16) of the first half bridges (11, 12, 13) are sequentially controllable for through-switching, during a second half period of the AC voltage applied to the input.

9. The power supply arrangement according to claim 6, wherein a means (E) for generating pulses for through-switching of the converter valves (V11, V12, V13, V14, V15, V16, V17, V18) is arranged downstream of the control means (S1).

10. The power supply arrangement according to claim 9, wherein pulse transmission means (Z11, Z12, Z13, Z20), which are connected to a control electrode of the converter valves (V11, V12, V13, V14, V15, V16, V17, V18), are arranged downstream of the pulse generating means (E).

11. The power supply arrangement according to claim 1, wherein the power supply arrangement is in an arc furnace for generating an arc.

12. An arc furnace with three power supply arrangements, wherein each of the three power supply arrangements are configured to include a transformer and a bridge circuit (BU); the transformer has at least two primary-side taps (1U1, 1U2) which form an input of the power supply arrangement, and a secondary winding of the transformer (TU) having a plurality of secondary-side taps (2U1, 2U2, 2U3, 2UN); the bridge circuit (BU) has a plurality of first half bridges (11, 12, 13) which include converter valves (V11, V12, V13, V14, V15, V16) and which each have a first terminal (A11, Al2, A13) of the bridge circuit, a bridge section with a choke (L1), and a second half bridge (20) which has converter valves (V17, V18) and a second terminal (A20) of the bridge circuit (BU); wherein each first terminal (A11, Al2, A13) is connected to one of the secondary-side taps (2U1, 2U2, 2U3) of the transformer; wherein the second terminal (A20) is connected to the output: wherein the plural secondary side-taps (2U1, 2U2, 2U3, 2UN) include a first end tap (2U1), an opposite second end tap (2UN) and at least one intermediate tap (2U2, 2U3) disposed therebetween; the first end tap (2U1) and each of the at least one intermediate tap (2U2, 2U3), respectively, are connected with the first terminal (A11, A12, A13) of the plural first half bridges (11, 12, 13), and wherein the primary sides of each of the transformers are connected in a Delta configuration, and an electrode is connected to the output of each power supply arrangement, and wherein an arc burns between the electrodes during operation of the arc furnace;

wherein each of the first half bridges (11, 12, 13) has a first converter valve (V11, V13, V15) and a second convener valve (V12, V14, V16); and wherein the second half bridge (20) comprises a first converter valve (V17) and a second converter valve (V18); cathodes of the first converter valve (V11, V13, V15) of each of the first half bridges (11, 12, 13) are connected to a cathode of the first converter valve (V17) of the second half bridge 20) at a first node (BK1) of the bridge circuit; anodes of the second converter valve (V12, V14, V16) of each of the first half bridges (11, 12, 13) are connected to an anode of the second converter valve (V18) of the second half bridge (20) at a second node (BK2) of the bridge circuit;

wherein in each first half bridge an anode of a first converter valve (V11, V13, V15) of the two convener valves and a cathode of a second converter valve (V12, V14, V16) of the two convener valves is connected to the first terminal (A11, A12, A13) of the bridge circuit (BU) arranged in the bridge section.

13. A system configured with two arc furnaces according to claim 12, wherein the arc furnaces is capable of being alternatingly supplied with electric current from the power supply arrangements.

14. A method for operating a power supply arrangement comprising the step of:

supplying a square-wave current (I2) to a load connected to an output of the power supply arrangement; the power supply arrangement includes a transformer and a bridge circuit (BU); the transformer has at least two primary-side taps (1U1, 1U2) which form an input of the power supply arrangement, and a secondary winding of the transformer (TU) having a plurality of secondary-side taps (2U1, 2U2, 2U3, 2UN); the bridge circuit (BU) has a plurality of first half bridges (11, 12, 13) which include converter valves (V11, V12, V13, V14, V15, V16) and which each have a first terminal (A11, Al2, A13) of the bridge circuit, a bridge section with a choke (L1), and a second half bridge (20) which has converter valves (V17, V18) and a second terminal (A20) of the bridge circuit (BU); wherein each first terminal (A11, Al2, A13) is connected to one of the secondary-side taps (2U1, 2U2, 2U3) of the transformer; wherein the second terminal (A20) is connected to the output; wherein the plural secondary side-taps (2U1, 2U2, 2U3, 2UN) include a first end tap (2U1), an opposite second end tap (2UN) and at least one intermediate tap (2U2, 2U3) disposed therebetween; the first end tap (2U1) and each of the at least one intermediate tap (2U2, 2U3), respectively, are connected with the first terminal (A11, Al2, A13) of the plural first half bridges (11, 12, 13);

connecting the load to the output of the power supply; and controlling using a control means (S1) converter valves (V11, V12, V13, V14, V15, V16) of the first half bridges (11, 12, 13) sequentially for through-switching in such a way that the square-wave curve of the current (I2) through the output of the power supply arrangement is transformed into a stepped current (I1) which flows through the input of the power supply arrangement and approximates the shape of the input voltage (U1);

wherein each of the first half bridges (11, 12, 13) has a first converter valve (V11, V13, V15) and a second converter valve (V12, V14, V16); and wherein the second half bridge (20) comprises a first converter valve (V17) and a second converter valve (V18); cathodes of the first converter valve (V11, V13, V15) of each of the first half bridges (11, 12, 13) are connected to a cathode of the first converter valve (V17) of the second half bridge (20) at a first node (BK1) of the bridge circuit; anodes of the second converter valve (V12, V14, V16) of each of the first half bridges (11, 12, 13) are connected to an anode of the second converter valve (V18) of the second half bridge (20) at a second node (BK2) of the bridge circuit;

wherein in each first half bridge an anode of a first converter valve (V11, V13, V15) of the two converter valves and a cathode of a second converter valve (V12, V14, V16) of the two converter valves is connected to the first terminal (A11, A12, A13) of the bridge circuit (BU) arranged in the bridge section.

* * * * *